United States Patent
Lee et al.

(10) Patent No.: US 10,903,497 B2
(45) Date of Patent: Jan. 26, 2021

(54) CATHODE HAVING IMPROVED SAFETY AND LITHIUM SECONDARY BATTERY INCLUDING THE SAME

(71) Applicant: LG Chem, Ltd., Seoul (KR)

(72) Inventors: Su-Rim Lee, Daejeon (KR); Su-Hyun Kim, Daejeon (KR); Hye-Won Jeong, Daejeon (KR); Jae-Hyun Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/086,339

(22) PCT Filed: Mar. 31, 2017

(86) PCT No.: PCT/KR2017/003586
§ 371 (c)(1),
(2) Date: Sep. 19, 2018

(87) PCT Pub. No.: WO2017/171494
PCT Pub. Date: Oct. 5, 2017

(65) Prior Publication Data
US 2019/0088950 A1    Mar. 21, 2019

(30) Foreign Application Priority Data

Mar. 31, 2016  (KR) .................. 10-2016-0039238

(51) Int. Cl.
*H01M 4/62* (2006.01)
*H01M 10/0525* (2010.01)
*H01M 4/13* (2010.01)
*H01M 4/36* (2006.01)
*H01M 10/42* (2006.01)
*H01M 4/02* (2006.01)

(52) U.S. Cl.
CPC ............ *H01M 4/622* (2013.01); *H01M 4/13* (2013.01); *H01M 4/366* (2013.01); *H01M 4/62* (2013.01); *H01M 10/0525* (2013.01); *H01M 10/4235* (2013.01); *H01M 2004/028* (2013.01)

(58) Field of Classification Search
CPC .... H01M 4/62; H01M 10/0525; H01M 10/42; H01M 4/36; H01M 4/13; H01M 4/622; H01M 10/4235; H01M 4/366; H01M 2004/028
See application file for complete search history.

(56) References Cited

U.S. PATENT DOCUMENTS

| | | |
|---|---|---|
| 6,759,164 B2 | 7/2004 | Palazzo et al. |
| 8,148,008 B2 | 4/2012 | Choi et al. |
| 2007/0015048 A1 | 1/2007 | Lee et al. |
| 2012/0168688 A1* | 7/2012 | Nakayama ............ H01G 11/30 252/511 |
| 2012/0202117 A1 | 8/2012 | Hirose et al. |
| 2013/0171520 A1* | 7/2013 | Nakayama ............ H01G 11/48 429/211 |
| 2013/0177807 A1 | 7/2013 | Lee et al. |
| 2013/0260223 A1 | 10/2013 | Jeong et al. |
| 2013/0260240 A1* | 10/2013 | Lee ....................... H01M 4/139 429/217 |
| 2014/0045063 A1 | 2/2014 | Iriyama et al. |
| 2014/0170482 A1* | 6/2014 | Park ....................... H01M 4/13 429/211 |
| 2014/0218875 A1* | 8/2014 | Nakayama ........... C08G 73/128 361/751 |
| 2014/0295290 A1* | 10/2014 | Park .................... H01M 4/0435 429/342 |
| 2015/0140424 A1* | 5/2015 | Ma ..................... H01M 4/5825 429/217 |
| 2016/0308217 A1* | 10/2016 | Liu ....................... C09C 1/3661 |
| 2017/0040647 A1 | 2/2017 | Jang et al. |
| 2017/0170481 A1 | 6/2017 | Jang et al. |

FOREIGN PATENT DOCUMENTS

| | | | |
|---|---|---|---|
| CN | 101213703 | A | 7/2008 |
| CN | 102484254 | A | 5/2012 |
| CN | 103097463 | A | 5/2013 |
| CN | 103503208 | A | 1/2014 |
| CN | 103930470 | A | 7/2014 |
| JP | 2002260668 | A | 9/2002 |
| JP | 2007242405 | A | 9/2007 |
| JP | 2014240189 | * | 12/2014 |
| JP | 2014067592 | * | 4/2017 |
| KR | 20070008405 | A | 1/2007 |
| KR | 100839369 | B1 | 6/2008 |

(Continued)

OTHER PUBLICATIONS

JP2014067592. MT. (Year: 2014).*

(Continued)

*Primary Examiner* — Alexander Usyatinsky

(74) *Attorney, Agent, or Firm* — Lerner, David, Littenberg, Krumholz & Mentlik, LLP

(57) ABSTRACT

The present disclosure relates to a cathode including a cathode active material and poly(amic acid). When the lithium secondary battery including the cathode is in an abnormal operation range of 160° C. or higher, condensation reaction of poly(amic acid) occurs to form polyimide. The polyimide surrounds cathode active material particles in the form of a coating film and prevents transport of lithium ions and electrons to interrupt current flow, and inhibits abnormal heat emission and thermal runaway or combustion caused by additional reactions.

7 Claims, No Drawings

(56) References Cited

FOREIGN PATENT DOCUMENTS

| KR | 20090042080 A | 4/2009 |
|----|---------------|--------|
| KR | 20120062893 A | 6/2012 |
| KR | 20130082433 A | 7/2013 |
| KR | 20130112324 A | 10/2013 |
| KR | 20160024776 A | 3/2016 |
| KR | 101637983 B1 | 7/2016 |
| KR | 101657081 B1 | 9/2016 |

OTHER PUBLICATIONS

20170042153KTO decision to grant a Patent (Year: 2017).*
JP2014240189 MT (Year: 2014).*
Search report from International Application No. PCT/KR2017/003586, dated Jul. 31, 2017.
Search Report from First Chinese Office Action for Application No. 201780019911.0 dated Sep. 27, 2020; 3 pages.

* cited by examiner

CATHODE HAVING IMPROVED SAFETY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/003586 filed on Mar. 31, 2017, which claims priority from Korean Patent Application No. 10-2016-0039238 filed on Mar. 31, 2016 in the Republic of Korea, the disclosures of which are incorporated herein by reference.

TECHNICAL FIELD

Background Art

As technological development and a need for mobile instruments have increased, a demand for secondary batteries as energy sources has increased rapidly and many studies have been conducted about batteries which meet various needs. Particularly, lithium secondary batteries, such as lithium ion batteries and lithium ion polymer batteries, having high energy density, discharge voltage and output stability have been increasingly in demand.

When a lithium secondary battery is subjected to abnormal environments, such as nail penetration, overcharge, external short-circuit and crush, the temperature of the battery is increased due to an internal short-circuit and exothermal reactions caused by various chemical reactions, and such exothermal reactions are accelerated by an increase in temperature, resulting in ignition of the battery.

To solve this, in the case of a battery provided with a battery casing having a predetermined volume, such as a cylindrical or prismatic battery casing, a circuit interrupt device (CID) element is provided in the cell to generate gas under the situation of abuse, so that the internal pressure of the battery may be increased to prevent ignition and burst of the battery by allowing the CID element to operate before a thermal runaway. In addition, a positive temperature coefficient (PTC) element is a thermally active conductor having a significantly high resistance value at a specific temperature and is one of the over-current protecting devices that interrupt short-circuit current and overcharge current automatically. Particularly, such a PTC element is an electrical device which undergoes a rapid increase in resistance at a specific temperature to interrupt the current supplied to the battery and undergoes a decrease in resistance when the temperature is reduced to supply current to the battery, and is applied to a cylindrical battery.

However, it is difficult to apply the conventional CID and PTC elements having a pouch-type battery casing. Thus, there is a need for a fundamental solution to ensure safety even under the abnormal environment of a battery.

DISCLOSURE

Technical Problem

The present disclosure is designed to solve the problems disclosed in the above and to solve the technical problems required to be solved from the past.

One aspect of the present disclosure is directed to providing a cathode which allows interruption of current flow and prevention of heat emission caused by additional reactions, when a battery is subjected to the situation of abuse under an abnormal environment.

Another aspect of the present disclosure is directed to providing a lithium secondary battery including the cathode.

Technical Solution

In one aspect of the present disclosure, there is provided a cathode including a cathode active material and poly(amic acid) represented by the following Chemical Formula 1a:

[Chemical Formula 1a]

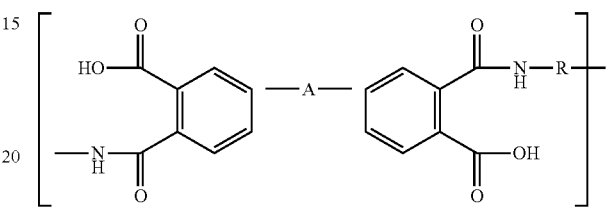

wherein R may independently represent a C1-C12 alkenyl or C6-C12 aromatic ring, and a carbon atom or hydrogen atom of the alkenyl or aromatic ring may be non-substituted or may be substituted with an oxygen, sulfur or halogen atom depending on atomic valences; and A independently represents a bond, C1-C12 alkenyl or C6-C12 aromatic ring, and a carbon atom or hydrogen atom of the alkenyl or aromatic ring may be non-substituted or may be substituted with an oxygen, sulfur or halogen atom depending on atomic valences.

The poly(amic acid) may be converted into polyimide at a temperature of 160° C. or higher.

The poly(amic acid) may be represented by the following Chemical Formula 2a:

[Chemical Formula 2a]

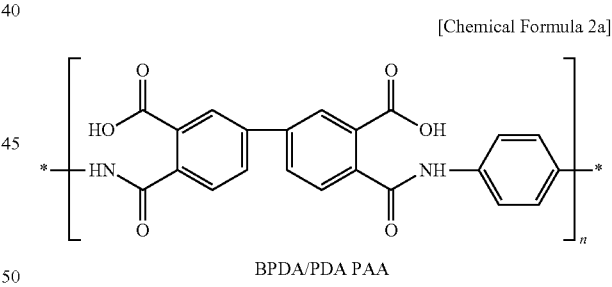

BPDA/PDA PAA

The poly(amic acid) may be used in an amount of 0.5-5 parts by weight based on 100 parts by weight of the cathode active material.

In an embodiment of the cathode of the present disclosure, the poly(amic acid) represented by the above Chemical Formula 1a may be used alone as a binder polymer.

The poly(amic acid) may have a molecular weight of 5,000-200,000.

The cathode may further include microcapsules including: a shell having a glass transition temperature or melting point at 160° C.; and pyridine and diacetic anhydride present inside of the shell.

In another aspect of the present disclosure, there is also provided a lithium secondary battery comprising the above-described cathode.

Advantageous Effects

When the lithium secondary battery including the cathode according to an embodiment of the present disclosure is in an abnormal operation range of 160° C. or higher, condensation reaction of poly(amic acid) occurs to form polyimide. The polyimide surrounds cathode active material particles in the form of a coating film and prevents transport of lithium ions and electrons to interrupt current flow, and inhibits abnormal heat emission and thermal runaway or combustion caused by additional reactions.

Since the conversion reaction from poly(amic acid) into polyimide occurs only at a temperature of 160° C. or higher, there is an advantage in that such conversion reaction does not occur at a temperature range which batteries are used at. In addition, the reaction occurs even though the active material layer includes no thermal initiator. Thus, there is an additional advantage in that side reactions caused by a thermal initiator may not occur in the battery.

BEST MODE

Hereinafter, the present disclosure will be described in detail. In this connection, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The cathode according to an embodiment of the present disclosure includes a cathode active material and poly(amic acid). The poly(amic acid) is polymerized into polyimide under the situation of abuse when it is used in a cathode, and thus can function as an insulating material which interrupts current flow. When poly(amic acid) is used at an anode, there is little or no effect of interrupting current flow with a small amount of poly(amic acid) due to the conductivity of the anode active material itself, even though poly(amic acid) is polymerized. Thus, in this case, poly(amic acid) has a limitation in use as an insulating material. Therefore, poly (amic acid) functions to interrupt current flow more effectively under the situation of abuse, when it is used at a cathode.

Poly(amic acid) that may be used herein can be converted into polyamide under an abnormal operating condition, i.e., at a temperature of 160° C. or higher.

The poly(amic acid) and polyimide may include the following Chemical Formula 1a and Chemical Formula 1b, respectively, as repeating units:

[Chemical Formula 1a]

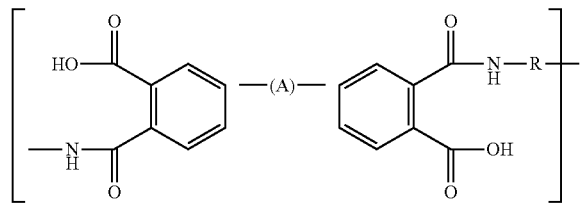

[Chemical Formula 1b]

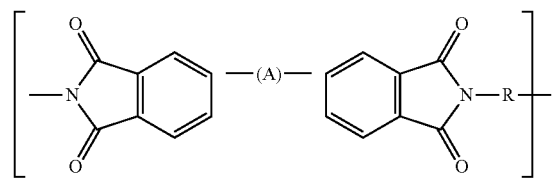

wherein, in each of the above chemical formula 1a and chemical formula 1b, R may independently represent a C1-C12 alkenyl or C6-C12 aromatic ring, and a carbon atom or hydrogen atom of the alkenyl or aromatic ring may be non-substituted or may be substituted with an oxygen, sulfur or halogen atom depending on atomic valences; and A independently represents a bond, C1-C12 alkenyl or C6-C12 aromatic ring, and a carbon atom or hydrogen atom of the alkenyl or aromatic ring may be non-substituted or may be substituted with an oxygen, sulfur or halogen atom depending on atomic valences.

The aromatic ring in each of R or A may independently represent a phenyl.

Non-limiting examples of compounds represented by Chemical Formula 1a and Chemical Formula 1b may be represented by the following Chemical Formula 2a and Chemical Formula 2b, respectively:

[Chemical Formula 2a]

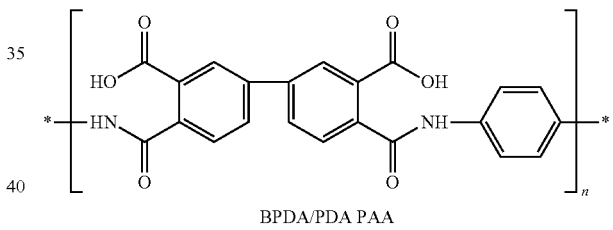

BPDA/PDA PAA

[Chemical Formula 2b]

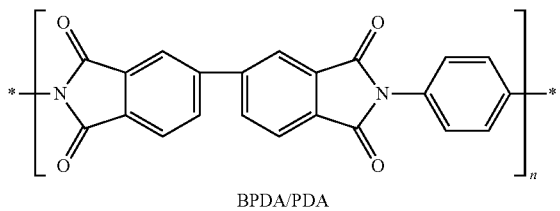

BPDA/PDA

The compound represented by the above Chemical Formula 2a may be obtained by the reaction of compounds as depicted in the following reaction scheme, but is not limited thereto:

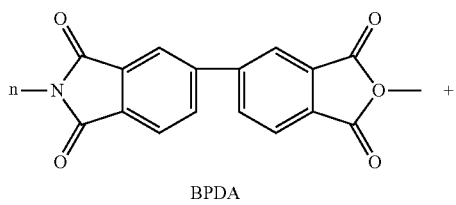

BPDA

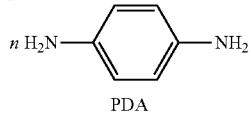

PDA

According to the present disclosure, polyimide surrounds the cathode active material particles in the form of an insulation coating film and prevents transport of lithium ions and electrons to interrupt current flow, and inhibits abnormal heat emission and thermal runaway or combustion caused by additional reactions.

The poly(amic acid) may be used in an amount of 0.5-5 parts by weight based on 100 parts by weight of the cathode active material. When the poly(amic acid) is used in an amount larger than the upper limit, resistance may be increased undesirably. When the poly(amic acid) is used in an amount less than the lower limit, the coating film cannot be formed adequately on the cathode active material and thus safety may not be ensured under an abnormal environment. The poly(amic acid) may also function as a binder polymer. Therefore, when preparing a cathode mixture slurry, another additional binder polymer may be used in a smaller amount or may not be used.

In addition, the poly(amic acid) may have a molecular weight of 5,000-200,000. When the poly(amic acid) has a molecular weight larger than the upper limit, mixing is not easy, transport of lithium ions may be delayed and resistance may be increased undesirably. When the poly(amic acid) has a molecular weight smaller than the lower limit, the coating film cannot be formed adequately on the cathode active material and thus safety may not be ensured under an abnormal environment.

According to an embodiment of the present disclosure, imidization of poly(amic acid) is thermal imidization occurring at a temperature of 160° C. or higher. In this case, the cathode mixture slurry should not contain any additive by which poly(amic acid) is imidized chemically, such as pyridine or acetic anhydride.

According to another embodiment, imidization of poly (amic acid) may occur in the presence of a compound. In this case, additives, such as pyridine and diacetic anhydride, may be included in the cathode mixture slurry. Herein, the additives may be present in the cathode mixture slurry so that poly(amic acid) repeating units, diacetic anhydride and pyridine are at a molar ratio of 1:5:5-1:20:20. For example, the cathode mixture slurry may include poly(amic acid) repeating units, diacetic anhydride and pyridine at a molar ratio of 1:10:10. The additives are effective for increasing an imidization degree, while providing an effect of allowing imidization to occur at a low temperature such as 40° C. Thus, it is preferred to make pyridine or diacetic anhydride participate in imidization of poly(amic acid) at 160° C. or higher. For example, microcapsules comprising a shell having a desired glass transition temperature or melting point of 160° C. or higher, and pyridine and diacetic anhydride present inside of the shell may be incorporated to the cathode mixture slurry. The shell may be formed of a material currently used in the art, and the material is not particularly limited as long as it has a desired glass transition temperature or melting point of 160° C. or higher. For example, the shell may be a polyolefin film, such as polyethylene or polypropylene. The poly(amic acid) is dispersed in homogeneously the cathode mixture slurry and is also dispersed homogeneously in the whole of the cathode formed from the cathode mixture slurry.

The cathode may be obtained by applying the cathode mixture slurry including a conductive material and a binder dispersed in a dispersion medium and optionally further including other fillers, onto cathode current collectors, followed by drying.

Non-limiting examples of the cathode active material include a manganese-based spinel active material, lithium metal oxide or a combination thereof. Additionally, the lithium metal oxide may be selected from the group consisting of a lithium-cobalt based oxide, lithium-manganese based oxide, lithium-nickel-manganese based oxide, lithium-manganese-cobalt based oxide and lithium-nickel-manganese-cobalt based oxide. Non-limiting particular examples of the cathode active material include, but are not limited to: $LiCoO_2$, $LiNiO_2$, $LiMnO_2$, $Li_{1-x}Mn_{2-x}O_4$ (wherein x is 0-0.33), $LiMnO_3$, $LiMn_2O_3$, $Li(Ni_aCo_bMn_c)O_2$ (wherein $0<a<1$, $0<b<1$, $0<c<1$, $a+b+c=1$), $Li(Ni_aCo_bMn_cAl_d)O_2$ (wherein $0<a<1$, $0<b<1$, $0<c<1$, $0≤d<0.1$, $a+b+c+d=1$), $LiNi_{1-y}Co_yO_2$ (wherein $0≤y<1$), $LiNi_{1-y}Co_{y-}Al_aO_2$ (wherein $0≤y≤1$, $0<a<0.1$), $LiCo_{1-y}Mn_yO_2$ (wherein $0≤y≤1$), $LiNi_{1-y}Mn_yO_2$ (wherein $0≤y≤1$), $Li(Ni_aCo_bMn_c)O_4$ ($0<a<2$, $0<b<2$, $0<c<2$, $a+b+c=2$), $LiMn_{2-z}Ni_zO_4$ (wherein $0<Z<2$), and $LiMn_{2-z}Co_zO_4$ (wherein $0<z<2$). In addition to the above, lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which a part of Li is substituted with alkaline earth metal ions; disulfide compound; $Fe_2(MoO_4)_3$, or the like may be used as cathode active material.

In general, the cathode current collector is provided with a thickness of 3-100 μm. The cathode current collector is not particularly limited, as long as it has high conductivity while not causing any chemical change in the corresponding battery. For example, it is possible to use stainless steel, aluminum, nickel, titanium, baked carbon, or aluminum or stainless steel whose surface is treated with carbon, nickel, titanium, silver, etc. The current collector may have fine surface irregularities to increase the adhesion of the cathode active material thereto, and may have various shapes, such as a film, sheet, foil, net, porous body, foam, and non-woven body.

In general, the conductive material may be added in an amount of 0.05-5 wt % based on the total weight of the cathode mixture slurry. The conductive material is not particularly limited, as long as it has conductivity while not causing any side reaction with the other elements of the battery. Particular examples of the conductive material may include: graphite, such as natural graphite or artificial graphite; carbon black, such as carbon black (Super-P), acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive metal oxides, such as titanium oxide; conductive materials, such as polyphenylene derivatives; or the like. Otherwise, as a conductive material, it is possible to use any one selected from carbon nanotubes (CNT), graphene, carbon nanofibers (CNF) and carbon fibers, or a combination of two or more of them.

The binder is an ingredient which assists the binding of an active material with a conductive material, or the like, and the binding to a collector. In general, the binder is added in an amount of 0.5-10 wt % based on the total weight of the mixture including the cathode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymer, or the like.

The filler is an ingredient inhibiting swelling of a cathode and is used optionally. The filler is not particularly limited, as long as it causes no chemical change in the corresponding battery and is a fibrous material. Particular examples of the filler include: olefin polymers, such as polyethylene or polypropylene; and fibrous materials, such as glass fibers or carbon fibers.

The dispersion medium may be selected from the group consisting of N-methyl-2-pyrrolidone, diacetone alcohol, dimethyl formaldehyde, propylene glycol monomethyl ether, methyl cellosolve, ethyl cellosolve, butyl cellosolve, isopropyl cellosolve, acetyl acetone, methyl isobutyl ketone, n-butyl acetate, cellosolve acetate, toluene, xylene and a mixture thereof.

The lithium secondary battery according to the present disclosure may comprise the cathode in combination with an anode, a separator and an electrolyte.

The anode is obtained by applying an anode active material onto an anode current collector, followed by drying. If desired, the above-described ingredients may be further comprised.

In general, the anode current collector is formed to have a thickness of 3-100 μm. The anode current collector is not particularly limited, as long as it has conductivity while not causing any chemical change in the corresponding battery. For example, copper, aluminum, stainless steel, nickel, titanium, baked carbon, copper or stainless steel surface treated with carbon, nickel, titanium, silver, etc., aluminum-cadmium alloy, or the like may be used as the anode electrode current collector. In addition, like the cathode current collector, the anode current collector may have fine surface irregularities to reinforce the binding force of the anode active material, and may have various shapes, such as a film, sheet, foil, net, porous body, foam, non-woven body, or the like.

Particular examples of the anode active material include: carbon such as non-graphitizable carbon or graphite-based carbon; metal composite oxides, such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, elements of Group 1, 2 or 3, halogen; $0 < x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

The separator is interposed between the cathode and the anode, and an insulating thin film having high ion permeability and mechanical strength is used as a separator. The separator may have a pore diameter generally of 0.01-10 μm and a thickness of 3-100 μm. Particular examples of the separator include: olefin polymers, such as chemically resistant and hydrophobic polypropylene; a polymer selected from the group consisting of polyimide (PI), aramid, polytetrafluoroethylene (PTFE), polychlorotrifluoroethylene (PCTFE), polyvinylidene fluoride (PVDF) and polyvinylidene fluoride-hexafluoroporpylene (PVDF-HFP), or a combination of two or more of them; sheets or non-woven webs made of glass fibers or polyethylene; or the like. In addition, a composite separator comprising a mixture of inorganic particles with a binder polymer, coated on at least one surface of a film- or nonwoven web-type porous substrate formed of an olefin based polymer may be used. When a solid electrolyte, such as a polymer, is used as an electrolyte, the solid electrolyte may also function as a separator.

The electrolyte may comprise a lithium salt and an organic solvent. Otherwise, a solid electrolyte, inorganic solid electrolyte, or the like, may be used.

Particular examples of the non-aqueous electrolyte may comprise aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimetnoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Particular examples of the organic solid electrolyte may comprise polyethylene derivatives, polyethylene oxide derivatives, polypropylene oxide derivative, phosphate polymers, poly-agitation lysine, polyester sulfide, polyvinyl alcohol, polyvinylidene fluoride, polymers containing an ionic dissociatable group, or the like.

Particular examples of the inorganic solid electrolyte may comprise nitrides, halides and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt is a material easily soluble in the non-aqueous electrolyte, and particular examples thereof may comprise LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, lithium tetraphenylborate, imide, or the like.

In addition, in order to improve charging/discharging characteristics, flame resistance, or the like, pyridine, triethyl phosphite, triethanol amine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, or the like, may be added to the non-aqueous electrolyte. Optionally, in order to impart incombustibility, a halogen-containing solvent, such as carbon tetrachloride or ethylene trifluoride, may be further added. In order to improve high-temperature storage characteristics, carbon dioxide gas may be further added.

If desired, the lithium secondary battery may be received in a pouch-type battery casing, prismatic battery casing or a cylindrical battery casing, but is not limited thereto. As used herein, 'pouch-type lithium secondary battery' means a lithium secondary battery received in a battery casing in the form of an aluminum laminate sheet. Unlike a prismatic or cylindrical battery casing, it is difficult to apply a CID or PTC element to a pouch-type battery casing. Thus, the effect of ensuring thermal safety of a battery derived from the use of the cathode according to the present disclosure is particularly useful for a pouch-type lithium secondary battery. However, the cathode according to the present disclosure is not limited to the application to a pouch-type lithium secondary battery.

MODE FOR DISCLOSURE

Hereinafter, the present disclosure will be explained in more detail with reference to the examples and comparative examples. The following examples and comparative examples are for illustrative purposes only and not intended to limit the scope of the present disclosure.

Example 1

First, 95 wt % of $Li(Ni_{1/3}Mn_{1/3}Co_{1/3})O_2$ as a cathode active material, 3 wt % of carbon black as a conductive material and 2 wt % of polyvinylidene fluoride (PVdF) as a binder polymer were added to N-methyl-2-pyrrolidone (NMP) as a solvent together with 0.5 wt % of BDPA/PDA PAA represented by the above Chemical Formula 2a to provide cathode mixture slurry. Next, the slurry was applied onto aluminum foil having a thickness of 20 μm as a cathode current collector and then dried to obtain a cathode. Then, pressing was carried out by means of a roll press to provide a cathode.

Example 2

A cathode was obtained in the same manner as Example 1, except that 1 wt % of PVdF and 1 wt % of BDPA/PDA PAA were used.

Example 3

A cathode was obtained in the same manner as Example 1, except that PVdF was not used and 2 wt % of BDPA/PDA PAA was used.

Example 4

A cathode was obtained in the same manner as Example 1, except that PVdF was not used and 3 wt % of BDPA/PDA PAA was used.

Example 5

A cathode was obtained in the same manner as Example 1, except that PVdF was not used and 5 wt % of BDPA/PDA PAA was used.

Comparative Example 1

A cathode was obtained in the same manner as Example 1, except that BDPA/PDA PAA was not used.

Comparative Example 2

A cathode was obtained in the same manner as Example 1, except that 0.2 wt % of BDPA/PDA PAA was used.

Comparative Example 3

A cathode was obtained in the same manner as Example 1, except that PVdF was not used and 7 wt % of BDPA/PDA PAA was used.

Test Example

Each of the cathodes according to Examples 1-5 and Comparative Examples 1-3 was determined for adhesion. The results are shown in Table 1. In addition, each of the cathodes according to Examples 1-5 and Comparative Examples 1-3 was determined for the volume resistance at room temperature and volume resistance upon the heat treatment at 170° C., and the variation rate in volume resistance upon the heat treatment at 170° C. was calculated. The results are shown in the following Table 1.

TABLE 1

| | Added amount of PVdF binder (wt %) | Added amount of poly (amic acid) (wt %) | Adhesion (gf/1.5 cm) | Initial volume resistance of electrode (ohm) | Volume resistance upon heat treatment at 170° C. (ohm) | Variation rate in volume resistance upon heat treatment at 170° C. (R170/R25) |
|---|---|---|---|---|---|---|
| Ex. 1 | 2 | 0.5 | 7.2 | 3.31 | 3.63 | 1.10 |
| Ex. 2 | 1 | 1 | 6.9 | 3.19 | 4.36 | 1.37 |
| Ex. 3 | 0 | 2 | 7 | 3.27 | 9.35 | 2.86 |
| Ex. 4 | 0 | 3 | 8.3 | 3.85 | 21.53 | 5.59 |
| Ex. 5 | 0 | 5 | 11.1 | 9.45 | 46.33 | 4.90 |
| Comp. Ex. 1 | 2 | 0 | 7.1 | 3.05 | 2.58 | 0.85 |
| Comp. Ex. 2 | 2 | 0.2 | 6.9 | 3.06 | 2.69 | 0.88 |
| Comp. Ex. 3 | 0 | 7 | 11.7 | 27.53 | 76.21 | 2.77 |

The present disclosure has been described in detail. However, it should be understood by those skilled in the art that the present disclosure may be realized in a modified form within the essential features of the present disclosure. The scope of the present disclosure is not defined by the detailed description but by the following claims, and it should be noted that various changes and modifications equivalent thereto are within the scope of the present disclosure.

What is claimed is:

1. A cathode comprising a cathode active material and poly(amic acid) represented by the following Chemical Formula 1a:

[Chemical Formula 1a]

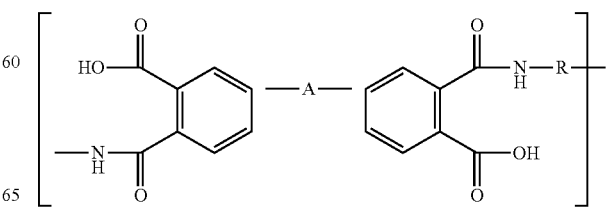

wherein R independently represents a C1-C12 alkenyl or C6-C12 aromatic ring, and a carbon atom or hydrogen atom of the alkenyl or aromatic ring is non-substituted or substituted with an oxygen, sulfur or halogen atom depending on atomic valences; and A independently represents a bond, C1-C12 alkenyl or C6-C12 aromatic ring, and a carbon atom or hydrogen atom of the alkenyl or aromatic ring is non-substituted or is substituted with an oxygen, sulfur or halogen atom depending on atomic valences, wherein the poly(amic acid) is included in an amount of 1 part to 5 parts by weight based on 100 parts by weight of the cathode active material.

2. The cathode according to claim 1, wherein the poly(amic acid) is converted into polyimide at a temperature of 160° C. or higher.

3. The cathode according to claim 1, wherein the poly(amic acid) is represented by the following Chemical Formula 2a:

[Chemical Formula 2a]

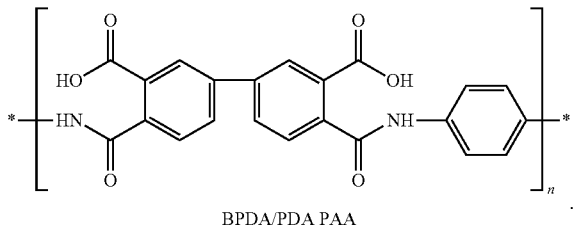

BPDA/PDA PAA

4. The cathode according to claim 1, wherein, as a binder polymer, only the poly(amic acid) represented by the above Chemical Formula 1a is comprised.

5. The cathode according to claim 1, wherein the poly(amic acid) has a molecular weight of 5,000-200,000.

6. The cathode according to claim 1, which further comprises microcapsules comprising: a shell having a glass transition temperature or melting point at 160° C.; and pyridine and diacetic anhydride present inside of the shell.

7. A lithium secondary battery comprising the cathode of claim 1.

* * * * *